Oct. 18, 1949.   F. J. KENNEDY   2,485,448
FISHING LURE
Filed May 11, 1946
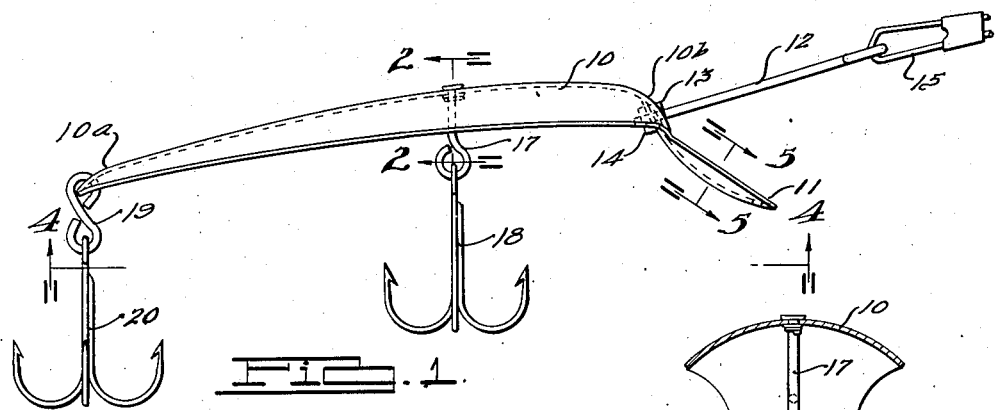
Fig. 1.
Fig. 2.
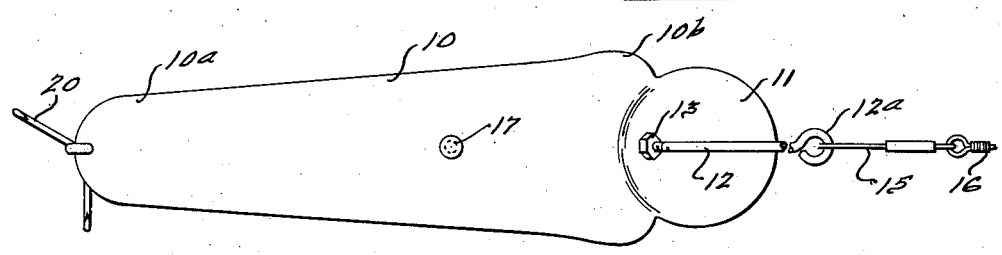
Fig. 3.
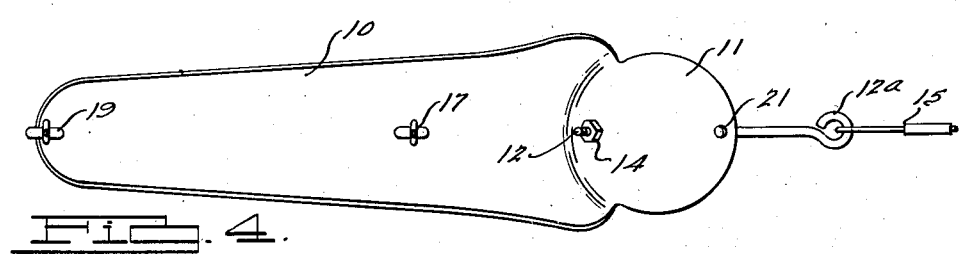
Fig. 4.
Fig. 5.
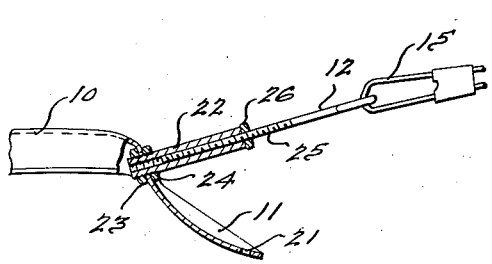
Fig. 6.
INVENTOR.
Frank J. Kennedy.
BY
Elmer Jamison Gray
ATTORNEYS.

Patented Oct. 18, 1949

2,485,448

UNITED STATES PATENT OFFICE 2,485,448

FISHING LURE

Frank J. Kennedy, Ann Arbor, Mich.

Application May 11, 1946, Serial No. 669,139

13 Claims. (Cl. 43—5)

This invention relates to fishing lures or bait and more particularly to a lure of improved construction which, when drawn through the water during trolling or casting operations, will have imparted thereto a desirable wobbler or swimming action capable of markedly increasing the effectiveness of the lure.

An object of the invention is to provide a fishing lure having improved means for connecting the fishing line thereto which, in conjunction with the shape of the attractor body, will produce an effective wobbler or swimming action as the lure is drawn through the water.

Another object of the invention is to provide a fishing lure having an attractor body terminating at its front end in a concave spoon portion and having an angularly disposed rigid link attached to the attractor body in such relation to the spoon portion and arranged for connection thereto of the fishing line in such manner as to cause the attractor body to oscillate back and forth as the lure is drawn through the water.

A further object of the invention is to provide an improved fishing lure terminating at its front end in an upwardly concaved spoon portion, the fishing line being connected at a point preferably forwardly of the spoon portion to a rigid link attached to the body of the lure at a point rearwardly of the spoon portion, the improved construction being such as to enable an effective swimming action or lateral oscillating motion to be imparted to the lure during use thereof in trolling or casting operations.

Still another object of the invention is to provide a lure of the foregoing character having adjustable means associated with the line connecting link for controlling the amplitude of lateral oscillating motion of the lure.

Other objects of this invention will appear in the following description and appended claims, reference being had to the accompanying drawings forming a part of this specification wherein like reference characters designate corresponding parts in the several views.

Fig. 1 is a side elevation of a fishing lure or bait constructed in accordance with one embodiment of the present invention.

Fig. 2 is a section taken substantially through lines 2—2 of Fig. 1 looking in the direction of the arrows.

Fig. 3 is a top plan view of the lure illustrated in Fig. 1.

Fig. 4 is a bottom plan view, partly in section, of the lure illustrated in Fig. 1, this view being taken from lines 4—4 of Fig. 1 looking in the direction of the arrows.

Fig. 5 is a section taken substantially through lines 5—5 of Fig. 1 looking in the direction of the arrows.

Fig. 6 is a fragmentary sectional view of the rear end of the lure illustrating another embodiment of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings I have illustrated, by way of example, certain embodiments of the invention as applied to a fishing lure constructed so as to accomplish in effective manner the improved results herein set forth when the lure is drawn through the water during trolling or casting operations. The lure illustrated in the drawings comprises an elongated convex or bowed attractor body 10 which may be formed of pressed metal, as shown, or other suitable material, such as a plastic composition. The attractor plate or body 10 tapers or narrows toward its rear end 10a and the depth or degree of convexity thereof progressively increases from the rear end toward the widest end 10b thereof. Integrally joined to the portion 10b of the attractor plate or body is a downwardly and angularly extending dished or upwardly concaved spoon portion 11. As illustrated in Figs. 3 and 4, the spoon portion 11, which projects beyond the main body of the lure, preferably has a disk-like configuration with the peripheral edge thereof forming the major part of a circle. This generally circular shape of the spoon portion is preferred since it enhances the lateral oscillating action imparted to the lure during use thereof.

A rigid link 12, preferably formed from a length of heavy gauge wire, provides the means for connecting a fishing line to the lure. This link terminates at its rear end in a threaded portion extending through a hole in the attractor body and adjustably secured thereto by means of nuts 13 and 14 which may be drawn down tightly to clamp the end of the link in rigid fashion to the attractor body. It will be noted that the connection of the link 12 to the attractor body is disposed at a point along the major axis of the body and an appreciable distance rearwardly of the center of curvature of the spoon portion 11. In other words, the link is connected at its rear end to the body of the lure eccentrically with respect to the disk-like spoon portion 11. The link 12 in the present embodiment is of such length as to extend forwardly and preferably upwardly in an inclined direction to a point in advance of the spoon portion 11, the link terminating in an eye 12a to which a conventional line coupling may be detachably connected. The fishing line 16 is in turn connected to the coupling 15.

The attractor body is adapted to support any suitable number of fishing hooks which may be arranged, as desired, in pairs or clusters of three hooks or in the form of single depending hooks. As illustrated in Fig. 1, a depending link 17 is attached to the attractor plate 17 intermediate the ends thereof and is formed at its lower end with an eye to which a cluster of three hooks 18 is connected. An S-shaped link 19 is also connected to the rear end of the attractor body and is adapted to support one or more depending hooks, such as a cluster of three hooks 20. The forward end of the spoon portion 11 is pierced to provide a hole 21 through the medium of which a third cluster of hooks may be attached, if desired.

In the embodiment of Figs. 1 to 5 inclusive the attachment of the link 12 to the attractor body is such as to permit a small amount of longitudinal adjustment of the link. In other words, the attaching means shown in this embodiment permits the effective length of the link forwardly of its point of connection with the attractor body to be varied somewhat in order to effect a variation in the amplitude of lateral oscillating motion of the lure as it is drawn through the water. The extent to which the effective length of the link may be adjusted may be increased as desired so as to increase the range or amplitude of this lateral oscillating motion.

In the embodiment of Fig. 6 the link connection between the attractor body and line comprises two relatively adjustable telescoped parts. In this embodiment an interiorly threaded or tapped tubular member 22 extends at its rear end through an aperture in the attractor body and is rigidly secured thereby by means of inner and outer nuts 23 and 24 threaded onto the exteriorly threaded rear end of the member 22. By tightening these nuts the tubular member 22 is rigidly secured to the attractor body. The link 12 has a threaded portion 25 adapted to be screwed into the member 22 to the desired distance and clamped thereto in adjusted position by means of a jamb nut 26. By means of this construction, illustrated in Fig. 6, a considerable range of adjustment is possible and the effective length of the link connection between the line coupling 15 and the attractor body may be varied to an appreciable extent.

I have found that the angular position in the water assumed by the attractor body as it is drawn through the water is materially affected by the angular relation between the line connecting link 12 and the spoon portion 11. In the present embodiments the included angle between the link 12 and the plane of the spoon portion 11 approximates 50°. In preferred practice, in order to achieve what I believe to be the best results during use of the lure, the link 12 and spoon portion 11 are preferably arranged so that the included angle therebetween will be within limits of from approximately 30° to 60°. I have further found that the amplitude of the wobbler action or lateral oscillating motion of the lure is measurably affected and controlled by the relative effective lengths of the spoon portion 11 and link 12, the effective length of the link being measured as the distance which the link projects forwardly of the attractor body to its point of connection with the fishing line. As the effective length of the link is increased I have found that the amplitude of lateral oscillation of the lure will proportionately increase, and vice versa as the effective length of the link 12 is decreased the swimming action or amplitude of lateral oscillation of the lure will proportionately decrease during operation. Consequently, by adjusting the link 12 endwise within the member 22 so as to shorten or lengthen the distance between the attractory body and the line connection 15 with the link, the lateral wobbler action of the lure as it is drawn through the water will be proportionately decreased or increased.

I claim:

1. A fishing lure comprising an attractor body terminating at its front end in a downwardly inclined concave spoon portion, a link rigidly attached at one end to the attractor body adjacent the rear of the spoon portion and extending forwardly beyond and above the spoon portion in fixed relation thereto for connection with a fishing line.

2. A fishing lure comprising an attractor body provided at its front end with a downwardly inclined concave spoon portion, a link rigidly attached at one end to the body and extending forwardly above the spoon portion in fixed relation thereto for connection with a fishing line.

3. A fishing lure comprising an elongate downwardly concaved attractor body provided at its front end with an upwardly concaved spoon portion, and a link extending from the front end of the attractor body and rigid therewith, the link extending above the spoon portion and terminating at its front end in means for connecting a fishing line thereto.

4. A fishing lure comprising an elongate downwardly concaved attractor body provided at its front end with an upwardly concaved spoon portion, and a link extending from the front end of the attractor body and rigid therewith, the link extending above and forwardly of the spoon portion and terminating at its front end in means for connecting a fishing line thereto.

5. A fishing lure comprising an elongate downwardly concaved attractor body provided at its front end with an upwardly concaved spoon portion, and a link rigidly connected to the front end of the attractor body and lying above the spoon portion in a vertical plane extending substantially through the central longitudinal axis of the attractor body, said link adapted to be connected at its front end to a fishing line.

6. A fishing lure comprising an elongate attractor body having at its front end a downwardly inclined portion of less length than the body, and a link rigidly connected to the attractor body adjacent the inclined portion thereof and extending above the latter and forwardly for connection to a fishing line.

7. A fishing lure comprising an elongate attractor body having at its front end a downwardly inclined portion of less length than the body, and a link rigidly connected to the attractor body adjacent the inclined portion thereof and extending above the latter and forwardly beyond the same for connection to a fishing line.

8. A fishing lure comprising an elongate attractor body having at its front end a downwardly inclined concaved spoon portion of less length than the body, and a link rigidly connected to the attractor body adjacent the inclined portion thereof and extending above the latter and forwardly for connection to a fishing line.

9. A fishing lure comprising an elongate attractor body having at its front end a downwardly inclined portion of less length than the body, and a link rigidly connected to the attractor body adjacent the rear of the inclined portion thereof and extending above the latter and forwardly beyond the same for connection to a fishing line.

10. A fishing lure comprising an attractor body terminating at its front end in a downwardly inclined concave spoon portion, a link rigidly attached at one end to the attractor body adjacent the rear of the spoon portion nad extending forwardly beyond and above the spoon portion in fixed relation thereto for connection with a fishing line, and means for adjusting the effective length of said link.

11. A fishing lure comprising an elongate downwardly concaved attractor body provided at its front end with an upwardly concaved spoon portion, a link extending from the front end of the attractor body and rigid therewith, the link extending above the spoon portion and terminating at its front end in means for connecting a fishing line thereto, and means for adjusting the effective length of said link.

12. A fishing lure comprising an elongate attractor body having at its front end a downwardly inclined portion of less length than the body, a link rigidly connected to the attractor body adjacent the inclined portion thereof and extending above the latter and forwardly for connection to a fishing line, and means for adjusting the effective length of said link.

13. A fishing lure comprising an elongate attractor body having at its front end a downwardly inclined portion of less length than the body, a link rigidly connected to the attractor body adjacent the inclined portion thereof and extending above the latter and forwardly for connection to a fishing line, the included angle between said link and inclined portion being between approximately 30° and 60°.

FRANK J. KENNEDY.

REFERENCES CITED

The following references are of record in the file of this patent:

UNITED STATES PATENTS

| Number | Name | Date |
|---|---|---|
| 1,252,721 | Rice | Jan. 8, 1918 |
| 1,978,875 | Wright | Oct. 30, 1934 |

FOREIGN PATENTS

| Number | Country | Date |
|---|---|---|
| 179,012 | Canada | Aug. 28, 1917 |